United States Patent
Xie et al.

(10) Patent No.: US 11,115,948 B2
(45) Date of Patent: Sep. 7, 2021

(54) MEASUREMENT SIGNAL SENDING METHOD, INDICATION INFORMATION SENDING METHOD, AND DEVICE

(71) Applicant: Huawei Technologies Co., Ltd., Shenzhen (CN)

(72) Inventors: Xinqian Xie, Beijing (CN); Zhiheng Guo, Beijing (CN); Wei Sun, Shenzhen (CN); Yongqiang Fei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 16/670,438

(22) Filed: Oct. 31, 2019

(65) Prior Publication Data

US 2020/0068518 A1    Feb. 27, 2020

Related U.S. Application Data

(63) Continuation of application No. PCT/CN2018/090640, filed on Jun. 11, 2018.

(30) Foreign Application Priority Data

Jun. 16, 2017    (CN) .......................... 201710459690.0

(51) Int. Cl.
*H04L 12/28* (2006.01)
*H04W 56/00* (2009.01)
(Continued)

(52) U.S. Cl.
CPC ....... *H04W 56/0045* (2013.01); *H04W 24/10* (2013.01); *H04W 72/0446* (2013.01); *H04W 92/18* (2013.01)

(58) Field of Classification Search
CPC .............. H04W 24/10; H04W 56/0045; H04B 2201/709709; H04L 25/0226
(Continued)

(56) References Cited

U.S. PATENT DOCUMENTS 9,560,675 B2 *   1/2017  Webb ................ H04W 74/0833
2014/0348100 A1 * 11/2014  Ratasuk ................ H04L 5/0048
                                                          370/329
(Continued)

FOREIGN PATENT DOCUMENTS

CN      102958075 A     3/2013
CN      103765969 A     4/2014
(Continued)

OTHER PUBLICATIONS

Huawei et al., "UE-to-UE measurement for cross-link interference mitigation", 3GPP Draft; R1-1706911, May 14, 2017, 7 pages.

*Primary Examiner* — John Pezzlo
(74) *Attorney, Agent, or Firm* — Slater Matsil, LLP (57) ABSTRACT

A method includes: determining, by a first terminal device, a first timing of a first measurement signal used by a second terminal device for measurement, where a first network device serving the first terminal device is different from a network device serving the second terminal device; determining, by the first terminal device, a second timing of a second measurement signal used by the first network device for measurement; and sending, by the first terminal device, the first measurement signal and the second measurement signal based on the first timing and the second timing respectively.

11 Claims, 5 Drawing Sheets

(51) Int. Cl.
*H04W 24/10* (2009.01)
*H04W 72/04* (2009.01)
*H04J 1/16* (2006.01)
*H04W 92/18* (2009.01)

(58) Field of Classification Search
USPC .............................. 370/252, 278, 329, 503
See application file for complete search history.

(56) References Cited

U.S. PATENT DOCUMENTS

2016/0095080 A1    3/2016  Khoryaev et al.
2017/0026919 A1    1/2017  Takeda et al.
2020/0077290 A1*   3/2020  Shi ..................... H04B 7/0478

FOREIGN PATENT DOCUMENTS

CN    106662634 A    5/2017
WO    2013082948 A1  6/2013

* cited by examiner

MEASUREMENT SIGNAL SENDING METHOD, INDICATION INFORMATION SENDING METHOD, AND DEVICE

CROSS-REFERENCE TO RELATED APPLICATIONS

This application is a continuation of International Application No. PCT/CN2018/090640, filed on Jun. 11, 2018, which claims priority to Chinese Patent Application No. 201710459690.0, filed on Jun. 16, 2017. The disclosures of the aforementioned applications are hereby incorporated by reference in their entireties.

TECHNICAL FIELD

This application relates to the communications field, and more specifically, to a measurement signal sending method, an indication information sending method, and a device.

BACKGROUND

In a wireless communications system, duplex modes may be classified into a time division duplex (TDD) mode and a frequency division duplex (FDD) mode. Because terminal devices are unevenly distributed in a communications network and uplink service volumes and downlink service volumes of different terminal devices may also vary, there may be a difference between uplink service volumes and downlink service volumes of different network-side devices in a same time period. In an existing TDD or FDD mode, different network-side devices use a same uplink and downlink transmission configuration in a same time period, so that an actual requirement of a service volume of each network-side device cannot be met efficiently. Therefore, a more flexible duplex technology is introduced in the current system. In other words, uplink and downlink transmission of each cell may be separately configured based on an actual service requirement. Generally, this duplex technology is referred to as a flexible duplex technology.

In a communications system using the flexible duplex technology, measurement includes uplink channel quality measurement and interference measurement. During uplink channel quality measurement, a network device measures a measurement signal from a terminal device in a cell in which the network device is located. During interference measurement, a terminal device measures a measurement signal from a terminal device in another cell. The measurement signal used for uplink channel quality measurement and the measurement signal used for interference measurement may be measurement signals of a same type, for example, both are sounding reference signals (SRS). Therefore, how the terminal device sends the measurement signal to enable a measurement signal receive end to perform relatively accurate measurement is an urgent technical problem to be resolved.

SUMMARY

Embodiments of this application provide a measurement signal sending method, an indication information sending method, and a device, to help a measurement signal receive end perform relatively accurate measurement.

According to a first aspect, a measurement signal sending method is provided, and the method includes: determining, by a first terminal device, a first timing of a first measurement signal used by a second terminal device for measurement, where a first network device serving the first terminal device is different from a network device serving the second terminal device; determining, by the first terminal device, a second timing of a second measurement signal used by the first network device for measurement; and sending, by the first terminal device, the first measurement signal and the second measurement signal based on the first timing and the second timing respectively.

It should be understood that a start moment at which the first terminal device sends the first measurement signal based on the first timing is different from a start moment at which the first terminal device sends the first measurement signal based on the second timing. In other words, the first terminal device sends the first measurement signal and the second measurement signal at two different moments.

In the current system, a terminal device always sends the first measurement signal and the second measurement signal by using one timing (that is, an uplink sending timing of the terminal device). In comparison, in this embodiment of this application, the terminal device sends the first measurement signal and the second measurement signal by using two different timings, thereby improving measurement accuracy.

In a possible implementation, the method further includes: receiving, by the first terminal device, first indication information and second indication information from the first network device, where the first indication information is used to indicate the first timing, and the second indication information is used to indicate the second timing; and the sending, by the first terminal device, the first measurement signal and the second measurement signal based on the first timing and the second timing respectively includes: sending, by the first terminal device, the first measurement signal based on the first indication information; and sending the second measurement signal based on the second indication information.

According to a second aspect, an indication information sending method is provided, and the method includes: determining, by a first network device, a sending object of a measurement signal of a first terminal device, where the first network device is a network device serving the first terminal device; when the sending object includes a second terminal device, determining, by the first network device, first indication information, and sending the first indication information to the first terminal device, where the first indication information is used to instruct the first terminal device to determine a first timing for sending a first measurement signal used by the second terminal device for measurement, and the first network device is different from a network device serving the second terminal device; and when the sending object further includes the first network device, determining, by the first network device, second indication information, and sending the second indication information to the first terminal device, where the second indication information is used to instruct the first terminal device to determine a second timing for sending a second measurement signal used by the first network device for measurement.

It should be understood that the first network device sends the first indication information and the second indication information at different moments. In this embodiment of this application, the first network device may send corresponding indication information to the terminal device based on the sending object, to help improve measurement accuracy.

In any one of the foregoing aspects or any possible implementation of any aspect, the first timing is equal to a downlink receiving timing of the first terminal device.

In any one of the foregoing aspects or any possible implementation of any aspect, a timing advance of the second timing relative to the first timing meets $TA_{2-1}=TA_0$, where $TA_{2-1}$ is the timing advance of the second timing relative to the first timing, and $TA_0$ is a timing advance of an uplink sending timing of the first terminal device relative to the downlink receiving timing of the first terminal device.

In this embodiment of this application, the first timing lags behind the second timing, to help reduce a deviation between a start moment at which the first terminal device sends the first measurement signal and a start moment at which the second terminal device receives the first measurement signal, so as to improve measurement accuracy.

Optionally, in any one of the foregoing aspects or any possible implementation of any aspect, the second timing is equal to the uplink sending timing of the first terminal device.

Optionally, in any one of the foregoing aspects or any possible implementation of any aspect, a type of the first measurement signal is the same as that of the second measurement signal.

Optionally, in any one of the foregoing aspects or any possible implementation of any aspect, both the first measurement signal and the second measurement signal are SRSs.

According to a third aspect, a communications device is provided. The communications device includes units configured to perform any one of the first aspect or the possible implementations of the first aspect, and the communications device may be a terminal device or a baseband chip.

According to a fourth aspect, a communications device is provided. The communications device includes units configured to perform any one of the second aspect or the possible implementations of the second aspect, and the communications device may be a network device or a baseband chip.

For example, the communications device may be a network device, wherein the network device is a first network device, and the network device comprises: a processing unit, configured to determine a sending object of a measurement signal of a first terminal device, wherein the sending object comprises a second terminal device and the first network device, the first network device is a network device serving the first terminal device, and the first network device is different from a network device serving the second terminal device, wherein the processing unit is further configured to: determine first indication information and second indication information, wherein the first indication information is used to instruct the first terminal device to determine a first timing for sending a first measurement signal used by the second terminal device for measurement, and the second indication information is used to instruct the first terminal device to determine a second timing for sending a second measurement signal used by the first network device for measurement; and a sending unit, configured to send the first indication information and the second indication information to the first terminal device. The first timing is equal to a downlink receiving timing of the first terminal device. A timing advance of the second timing relative to the first timing meets: $TA_{2-1}=TA_0$, wherein $TA_{2-1}$ is the timing advance of the second timing relative to the first timing, and $TA_0$ is a timing advance of an uplink sending timing of the first terminal device relative to the downlink receiving timing of the first terminal device.

According to a fifth aspect, a communications device is provided, including a transceiver component and a processor, to enable the communications device to perform the method in any one of the first aspect or the possible implementations of the first aspect. The communications device may be a terminal device or a baseband chip. If the communications device is a terminal device, the transceiver component may be a transceiver; or if the communications device is a baseband chip, the transceiver component may be an input/output circuit of the baseband chip.

According to a sixth aspect, a communications device is provided, including a transceiver component and a processor, to enable the communications device to perform the method in any one of the second aspect or the possible implementations of the second aspect. The communications device may be a network device or a baseband chip. If the communications device is a network device, the transceiver component may be a transceiver; or if the communications device is a baseband chip, the transceiver component may be an input/output circuit of the baseband chip.

According to a seventh aspect, a computer program product is provided, and the computer program product includes computer program code. When the computer program code is run by a terminal device, the terminal device is enabled to perform the method in any one of the first aspect or possible implementations of the first aspect.

According to an eighth aspect, a computer program product is provided, and the computer program product includes computer program code. When the computer program code is run by a network device, the terminal device is enabled to perform the method in any one of the second aspect or possible implementations of the second aspect.

According to a ninth aspect, a computer-readable medium is provided. The computer-readable medium stores program code, and the program code includes an instruction used to perform the method in any one of the first aspect or possible implementations of the first aspect.

According to a tenth aspect, a computer-readable medium is provided. The computer-readable medium stores program code, and the program code includes an instruction used to perform the method in any one of the second aspect or possible implementations of the second aspect.

In the embodiments of this application, the first terminal device may send the first measurement signal and the second measurement signal by using different timings, to help improve measurement accuracy. Further, because transmitting the first measurement signal between the first terminal device and the second terminal device requires relatively short time (that is, a relatively short latency), it may be considered that clocks of the first terminal device and the second terminal device are approximately synchronous. The first terminal device sends the first measurement signal by using the first timing that is equal to the downlink receiving timing of the first terminal device, to help synchronize sending the first measurement signal by the first terminal device with receiving the first measurement signal by the second terminal device.

DETAILED DESCRIPTION OF ILLUSTRATIVE EMBODIMENTS

The following describes technical solutions of this application with reference to the accompanying drawings.

It should be understood that division of manners, cases, and categories in the embodiments of this application are merely for ease of description, and should not constitute a particular limitation, and features of the manners, categories, and cases may be combined if they are not mutually exclusive.

It should also be understood that "first", "second", and "third" in the embodiments of this application are merely intended to distinguish, and should not be construed as any limitation on this application.

The method in the embodiments of this application may be applied to a long term evolution (LTE) technology system, a long term evolution advanced (LTE-A) technology system, an enhanced long term evolution (eLTE) technology system, and a new radio (NR) communications system; or may be extended to a similar wireless communications system, such as wireless fidelity (WiFi) and a cellular system related to a 3rd generation partnership project (3GPP).

In the embodiments of this application, a network device is an apparatus that is deployed in a radio access network and that is used to provide a wireless communication function for a terminal device. The network device may include base stations in various forms, for example, a macro base station, a micro base station (also referred to as a small cell), a relay station, and an access point. In systems using different radio access technologies, names of devices having functions of a base station may vary. For example, the network device may be an access point (AP) in a wireless local area network (WLAN), or may be an evolved NodeB (eNB or eNodeB) in an LTE system. Alternatively, the network device may be a NodeB (Node B) in a 3rd generation (3G) system. In addition, the network device may be a relay station or an access point, or a vehicle-mounted device, a wearable device, a network device in a future 5th generation (5G) communications network, a network device in a future evolved public land mobile network (PLMN) network, or the like.

In the embodiments of this application, the terminal device may also be referred to as user equipment (UE), an access terminal, a terminal device unit (subscriber unit), a terminal device station, a mobile station, a mobile station (MS), a remote station, a remote terminal, a mobile device, a user terminal, a terminal (terminal), a wireless communications device, a terminal device agent, or a terminal device apparatus. The terminal device may include various handheld devices, vehicle-mounted devices, wearable devices, and computing devices that have a wireless communication function, or another processing device connected to a wireless modem. The terminal device may further include a user unit, a cellular phone (cellular phone), a smartphone (smart phone), a wireless data card, a personal digital assistant (personal digital assistant, PDA) computer, a tablet computer, a wireless modem (modem), a handset (handset), a laptop computer (laptop computer), a machine type communication (MTC) terminal, and a station (ST) in a wireless local area network (wireless local area networks, WLAN). The terminal device may be a cellular phone, a cordless phone, a session initiation protocol (SIP) phone, a wireless local loop (WLL) station, and a next generation communications system, for example, a terminal device in a 5G network or a terminal device in a future evolved PLMN network.

To facilitate understanding of the embodiments of this application, several concepts in the embodiments of this application are first described.

Timing: The timing may be understood as a start moment (or an end moment) at which a sending device sends a signal, or a start moment (or an end moment) at which a receiving device receives a signal. For ease of description, the following uses a radio frame as an example. Certainly, the timing may be another type of a time unit such as a slot or a symbol.

Timing used for signal sending may be usually understood as an absolute moment.

When sending an uplink signal, a terminal device needs to determine, based on a received synchronization signal, a start moment of the radio frame used for downlink receiving. The start moment of the radio frame used for downlink receiving may be used as a reference point, and further, the terminal device determines, based on the start moment of the radio frame, a start moment of a radio frame used for uplink sending. In this case, the start moment of the radio frame used for uplink sending may be considered as a timing, and the timing is the absolute moment. Then, the terminal device sends the uplink signal based on the timing.

It should be understood that timing may be understood as a time point. In other words, one timing may include a plurality of time points (e.g., a plurality of moments). If the plurality of moments include at least three moments, the at least three moments are arranged at equal intervals. For example, assuming that a start moment of a radio frame used by a terminal device for downlink receiving is used as a reference moment, and is denoted as 0 millisecond (ms), and a length of one radio frame is denoted as 10 ms, a timing of the radio frame used by the terminal device for downlink receiving may include a plurality of moments such as 0 ms, 10 ms, and 20 ms, in other words, the terminal device may receive a downlink signal at all or some of the plurality of time points such as 0 ms, 10 ms, and 20 ms. A start moment of a radio frame used by the terminal device for uplink sending is x ms earlier than the start moment of the radio frame used for downlink receiving. An uplink sending timing used by the terminal device may include a plurality of moments such as (0-x) ms, (10-x) ms, and (20-x) ms. Certainly, the plurality of moments may be alternatively arranged at different intervals, and this is not limited herein.

A timing advance may be understood from a perspective of a relative moment.

Figure 1:
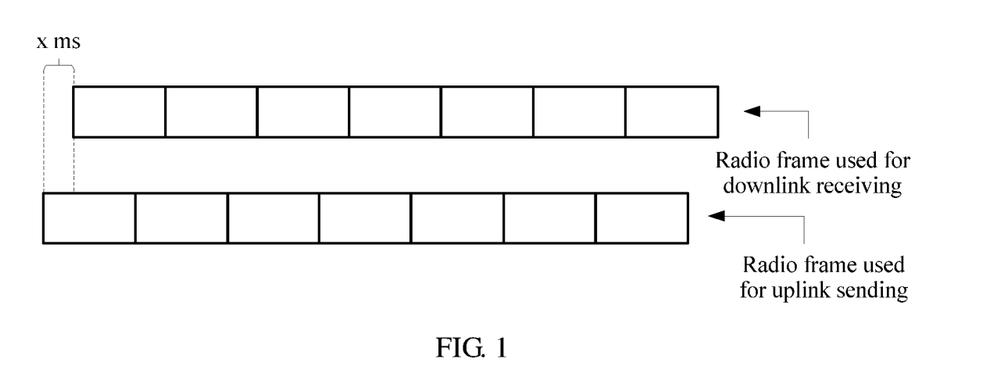
FIG. 1 is a schematic diagram of a radio frame used for downlink sending and a radio frame used for uplink receiving.

All timings specified in a communications protocol are relative moments. Generally, a time reference point is defined in the protocol, and a timing in the protocol usually has an offset relative to the time reference point. FIG. 1 is a schematic diagram of a radio frame used for downlink sending and a radio frame used for uplink receiving. In a protocol, a start moment of the radio frame used for downlink receiving is usually used as a time reference point. As shown in FIG. 1, it is defined that a start moment of a radio frame used by a terminal device for uplink sending is x ms earlier than a start moment of a radio frame used by the terminal device for downlink receiving, and x ms may be considered as a timing advance. Numbers of the two radio frames may be the same.

The following explains two concepts of timing equality and timing inequality.

If a time point included in one timing is a subset of a time point included in another timing, it may be considered that the two timings are equal.

For example, assuming that time points included in a timing A are 0 ms, 10 ms, 20 ms, . . . , and a timing B includes some of 0 ms, 10 ms, 20 ms, . . . , it may be considered that the timing A and the timing B are equal.

Similarly, if a time point included in one timing is not a subset of a time point included in another timing, it may be considered that the two timings are unequal.

For example, assuming that time points included in a timing A are 0 ms, 10 ms, 20 ms, . . . , and a timing C includes 5 ms, 15 ms, 25 ms, . . . , it may be considered that the timing A and the timing C are unequal.

The timing equality and timing inequality may also be related to a timing advance. For example, if advances of a timing E and a timing F relative to a start moment of a radio frame used for downlink receiving (e.g., relative to a reference point) are the same, where both the timing E and the timing F are used for uplink sending, it is considered that the timing E and the timing F are equal; or if advances of timing E and the timing F relative to the reference point are different, it is considered that the timing E and the timing F are unequal.

Figure 2:
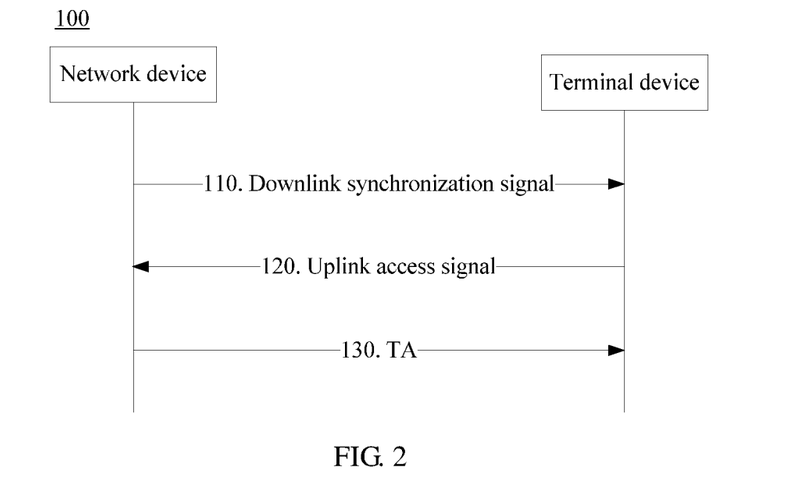
FIG. 2 is a schematic interaction diagram of an example of a method 100 for determining a timing by a first terminal device.

It can be learned from the foregoing description that, regardless of whether interference measurement is performed or channel quality measurement is performed, a terminal device needs to send a measurement signal. In the current system, when a first terminal device performs the two types of measurement, the first terminal device sends a measurement signal by using one timing, in other words, sends the measurement signal by using an uplink sending timing of the first terminal device. FIG. 2 is a schematic interaction diagram of an example of a method 100 for determining a timing by a first terminal device.

It should be understood that FIG. 2 shows detailed steps or operations of the method 100. However, these steps or operations are merely an example. In this embodiment of this application, another operation may be further performed or only some of the operations in FIG. 1 may be performed.

As shown in FIG. 2, the method 100 may include the following steps.

Step 110: A first network device sends a downlink synchronization signal; correspondingly, a first terminal device determines a downlink receiving timing of the first terminal device by detecting the downlink synchronization signal from the first network device.

Specifically, the first network device is a network device serving the first terminal device. For ease of description, the "downlink receiving timing of the first terminal device" may be denoted as a "timing I". The timing I is used by the first terminal device to perform downlink receiving. In other words, the timing I is used by the first terminal device for receiving a (downlink) signal (for example, a synchronization signal, a data signal, or a control signal) from the first network device.

After the first network device determines the timing I, the first terminal device can receive the (downlink) signal at a time point included in the timing I.

Step 120: The first terminal device sends an uplink access signal; correspondingly, the first network device receives the uplink access signal.

A sending start moment at which the first network device sends the downlink synchronization signal is a first moment, and a receiving start moment at which the first network device receives the uplink access signal is a second moment.

Step 130: The first network device determines a timing advance (timing advanced, TA) based on the first moment and the second moment, and sends the TA to the first terminal device; correspondingly, the first terminal device receives the TA.

The TA is equal to a difference between the second moment and the first moment. It should be understood that a difference between the first moment and a start moment at which the first terminal device receives the downlink synchronization signal sent by the first network device to the first terminal device is equal to TA/2.

Step 140: The first terminal device determines an uplink sending timing of the first terminal device based on the timing I, the TA, and a preset parameter timing advance offset (TAoffset).

For ease of description, the "uplink sending timing of the first terminal device" may be denoted as a timing II, and the timing II is used by the first terminal device to perform uplink sending. In other words, the timing II is used by the first terminal device for sending an (uplink) signal (for example, a data signal or a control signal) to the first network device. After determining the timing II, the first terminal device can send the (uplink) signal at a time point included in the timing II. The timing II is TA+TAoffset earlier than the timing I.

It should be understood that for another terminal device, for example, a second terminal device, for a method for determining a downlink receiving timing and an uplink sending timing of the second terminal device, reference may be made to related descriptions of the method 100. For brevity, details are not described herein again.

If interference measurement is performed between the first terminal device and the second terminal device, the first terminal device sends a measurement signal based on the timing II, and the second terminal device receives the measurement signal based on the downlink receiving timing of the second terminal device. If uplink channel quality measurement is performed between the first terminal device and the first network device, the first terminal device sends a measurement signal based on the timing II, and the first network device receives the measurement signal based on an uplink receiving timing of the first network device.

For ease of description in the accompanying drawings, the "uplink receiving timing of the first network device" may be denoted as a "timing 0", and the "downlink receiving timing of the second terminal device" is denoted as a "timing III".

Figure 3:
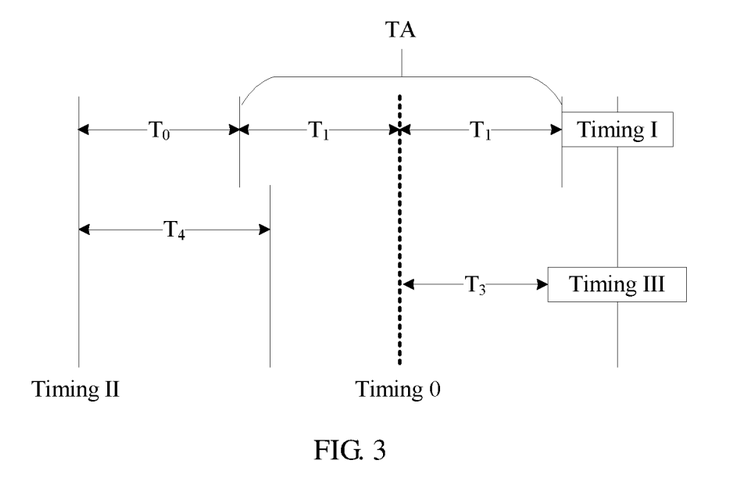
FIG. 3 is a schematic diagram of an example in which a first terminal device sends a measurement signal based on a timing II.

FIG. 3 is a schematic diagram of an example in which the first terminal device sends a measurement signal based on the timing II. It is assumed that a clock of the first network device is used as a reference, and a signal sent by the first network device reaches the first terminal device after T1. It may be considered that the timing I lags T1 behind the timing 0 (it should be understood that 2T1=TA).

It can be learned from the foregoing description that the timing II is TA+TAoffset earlier than the timing I, and therefore the timing II is TAoffset+TA/2 earlier than the timing 0. Assuming that a value of TAoffset is T0, the timing II is T1+T0 earlier than the timing 0.

The timing III lags T3 behind a downlink sending timing of a second network device. Because clocks of the first network device and the second network device are usually synchronous, the timing III lags T3 behind the timing 0. It should be understood that the second network device is a network device serving the second terminal device.

Time required for signal transmission between two devices is positively correlated to a distance between the two devices. To be specific, a shorter distance between two devices indicates shorter time required for signal transmission between the two devices. However, for two terminal devices belonging to different cells, a shorter distance between the two terminal devices leads to stronger interference between the two terminal devices. To improve data transmission efficiency of the two terminal devices, interference information between the two close terminal devices needs to be obtained. Therefore, a distance between two terminal devices that perform interference measurement is usually relatively short. Therefore, it is assumed that the first network device is a network device serving the first terminal device, the second terminal device is a terminal device that performs interference measurement with the first terminal device, and a distance between the first network device and the first terminal device is greater (longer) than a distance between the first terminal device and the second terminal device. When the first terminal device sends a measurement signal, the second terminal device receives the measurement signal earlier than the first network device does. However, the timing III lags behind the timing 0. If the measurement signal is sent by using this method, a relatively large latency difference may exist between a start moment at which the measurement signal reaches the second terminal device and a receiving start moment at which the second terminal device receives the measurement signal.

Specifically, a latency difference between the start moment at which the measurement signal reaches the second terminal device and a detection start moment at which the second terminal device detects a measurement signal 1 meets:

$$\Delta T = T1 + T0 - T4 + T3.$$

For T1, T0, and T3, refer to the foregoing related descriptions. T4 is duration between a sending start moment at which the first terminal device sends the measurement signal and a receiving start moment at which the second terminal device receives the measurement signal 1.

It may be learned from this that if the first terminal device sends the measurement signal based on the timing II, the second terminal device cannot accurately receive the measurement signal, and consequently the second terminal device cannot accurately perform interference measurement.

Based on the foregoing description, an embodiment of this application provides a measurement signal sending method, to help improve measurement accuracy.

Figure 4:
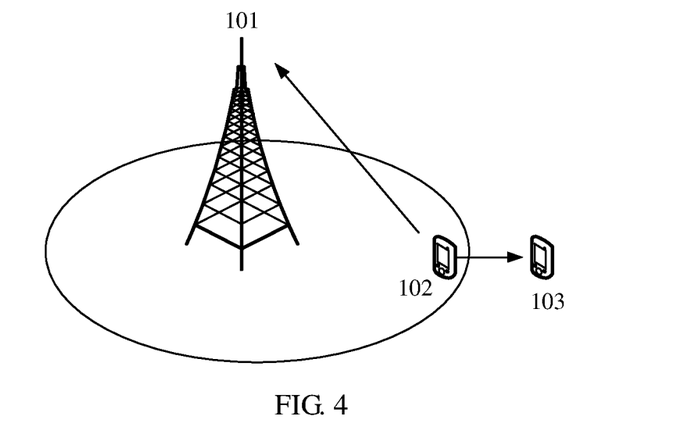
FIG. 4 shows an application scenario applicable to an embodiment of this application.

FIG. 4 shows an application scenario applicable to this embodiment of this application. As shown in FIG. 4, the application scenario includes a first network device 101. The application scenario further includes a first terminal device 102 within a coverage area of the first network device 101, and a second terminal device 103 outside the coverage area of the first network device 101. There may be a plurality of first terminal devices 102 and a plurality of second terminal devices.

The following describes the method in this embodiment of this application in detail with reference to FIG. 5 to FIG. 8.

Figure 5:
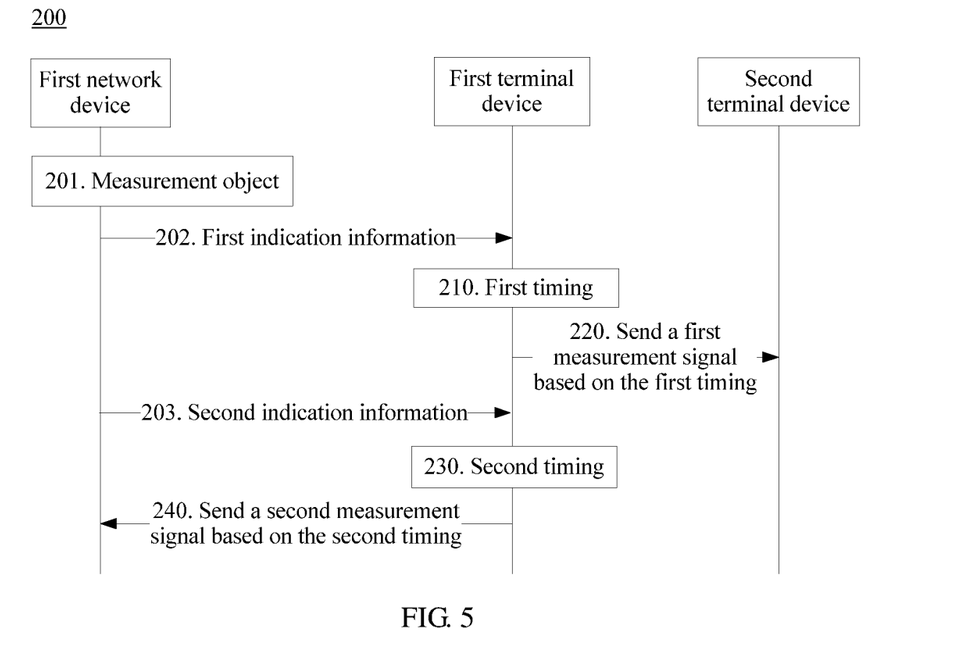
FIG. 5 is a schematic interaction diagram of an example of a method according to an embodiment of this application.

FIG. 5 is a schematic interaction diagram of an example of a method according to an embodiment of this application. It should be understood that FIG. 5 shows detailed steps or operations of a method 200. However, these steps or operations are merely an example. In this embodiment of this application, another operation may be further performed or only some of the operations in FIG. 5 may be performed. A first network device, a first terminal device, and a second terminal device in FIG. 5 may correspond to the network device 101, the terminal device 102, and the terminal device 103 respectively in the foregoing communication scenario.

As shown in FIG. 5, the method 200 may include step 210 and step 220.

Step 210: The first terminal device determines a first timing of a first measurement signal used by the second terminal device for measurement.

It should be understood that the first timing is different from the timing II in the foregoing description. Specifically, the first timing lags behind the timing II. The timing II is an uplink sending timing of the first terminal device. However, the first timing is used by the first terminal device to send the first measurement signal used by the second terminal device for measurement.

Optionally, the first terminal device may determine the first timing in a plurality of manners.

In an optional example, the first terminal device may determine the first timing according to the method 100.

For example, the first terminal device may determine the first timing based on a latency caused by transmission of a signal 1 between the first terminal device and to the second terminal device.

In another optional example, because a distance between the first terminal device and the second terminal device is relatively short, time required by the first measurement signal to reach the second terminal device by using the first terminal device is relatively short (namely, a latency of the first measurement signal is relatively short). If the first measurement signal is sent by using the timing II, the first measurement signal may reach the second terminal device in advance. Therefore, the first terminal device sends the first measurement signal by using the first timing that lags behind the uplink sending timing of the first terminal device, to help improve measurement accuracy.

Further, the latency may be approximately equal to 0. The first timing may be equal to a timing I, so as to synchronize a receiving start moment at which the second terminal device receives the first measurement signal with a sending start moment at which the first terminal device sends the first measurement signal. In other words, the first timing may be equal to a downlink receiving timing of the first terminal device.

For the timing II and the timing I, refer to the foregoing related description. For brevity, details are not described again.

In still another optional example, the first terminal device may determine the first timing by receiving first indication information from the first network device. Optionally, the method 200 may include the following steps:

Step 201: The first network device determines a sending object of a measurement signal of the first terminal device.

The sending object of the measurement signal of the first terminal device may be understood as a device receiving the measurement signal of the first terminal device.

Step 202: The sending object includes the second terminal device, and the first network device determines first indication information and sends the first indication information; correspondingly, the first terminal device receives the first indication information, where the first indication information is used to instruct the first terminal device to determine the first timing for sending the first measurement signal used by the second terminal device for measurement.

In other words, if the first network device determines that the sending object of the measurement signal of the first terminal device is the second terminal device, the first network device may instruct the first terminal device to send the first measurement signal by using the first timing.

The first indication information may indicate the first timing in a plurality of manners.

For example, the first indication information may explicitly indicate the first timing.

For another example, the first indication information may implicitly indicate the first timing. Specifically, the first indication information may indicate a configuration parameter for sending the first measurement signal by the first terminal device. There is a correspondence between the configuration parameter and the first timing. Optionally, the configuration parameter may include at least one of a period, a subframe number (an index), a symbol number, a frequency domain resource location, or a sequence identifier that is used for sending the first measurement signal by the first terminal device. The sequence identifier may include a first identifier. The first identifier is an identifier for sending the first measurement signal to the second terminal device by the first terminal device, and the first identifier may be a dedicated cell identifier or a common cell identifier, or may be a pre-agreed identifier.

Step 210 may include the following step:

The first terminal device determines the first timing based on the first indication information.

Step 220: The first terminal device sends the first measurement signal based on the first timing.

Specifically, after determining the first timing, the first terminal device may send the first measurement signal at a time point included in the first timing. That the first terminal device sends the first measurement signal based on the first timing may include one of the following several cases.

In an optional example, a time domain resource used to send the first measurement signal is the last symbol in a time domain scheduling unit, and the first terminal device delays a start time point for sending the first measurement signal for first duration.

Figure 6:
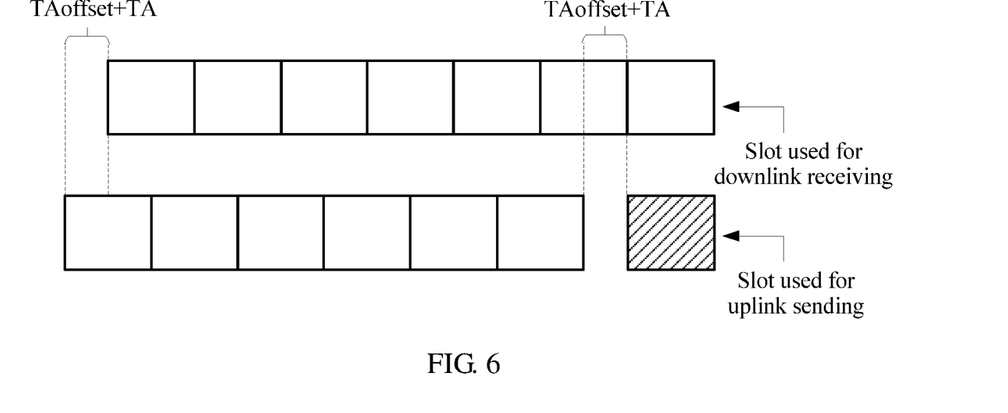
FIG. 6 is a schematic diagram of an example in which a first terminal device sends a measurement signal according to an embodiment of this application.

FIG. 6 is a schematic diagram of an example in which a first terminal device sends a measurement signal according to an embodiment of this application. As shown in FIG. 6, assuming that the time domain resource used to send the first measurement signal is the last symbol in a slot, the first terminal device may delay sending the last symbol for the first duration.

Optionally, the first duration may be greater than 0 and less than or equal to a value of TA+TAoffset in the foregoing description. The value of TA+TAoffset may be understood as duration corresponding to TA+TAoffset. For example, the first duration is equal to the value of TA+TAoffset. Assuming that TA+TAoffset is 10 microseconds (microsecond, us) earlier, the value of TA+TAoffset is 10 us. In this case, that the first terminal device delays sending the last symbol in the slot for the first duration may be understood as that the first terminal device delays sending the last symbol in the slot for 10 us.

Figure 7:
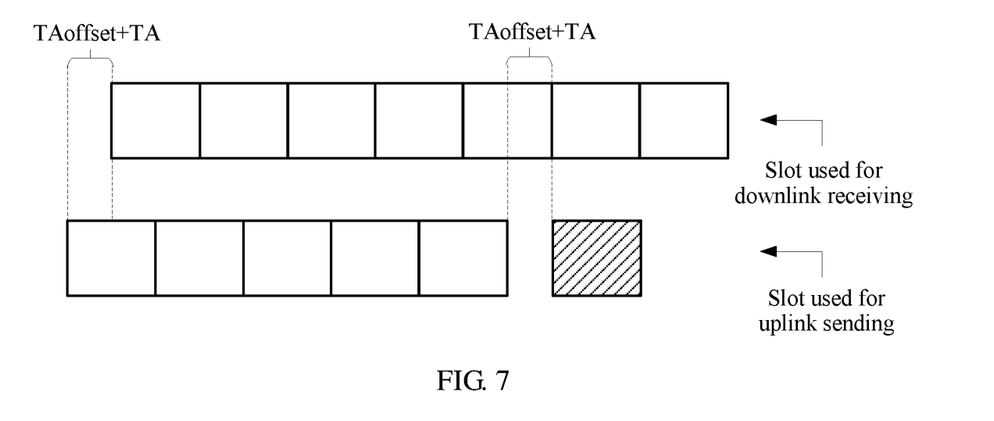
FIG. 7 is a schematic diagram of another example in which a first terminal device sends a measurement signal according to an embodiment of this application.

In an optional example, a time domain resource used to send the first measurement signal is a symbol other than the last symbol in a time domain scheduling unit, and the first terminal device delays a start time point for sending the first measurement signal for the first duration. In this case, the first terminal device may not send the last symbol in the time domain scheduling unit (it may be considered that the time domain scheduling unit is reduced by one symbol).

FIG. 7 is a schematic diagram of an example in which a first terminal device sends a measurement signal according to an embodiment of this application. As shown in FIG. 7, when the time domain resource used to send the first measurement signal is a penultimate symbol in a slot, the first terminal device may delay a start time point of sending the penultimate symbol for the first duration, and do not send the last symbol in the time domain scheduling unit. For example, as shown in FIG. 7, the slot used for uplink sending includes only six symbols.

It should be understood that the time domain scheduling unit in this embodiment of this application refers to a length of time. For example, the time domain scheduling unit may be a subframe (subframe), a slot (slot), a mini-slot (mini-slot), or any time unit that can be used to schedule data transmission.

In the current system, the first terminal device always sends the first measurement signal by using the timing II. In comparison, in this embodiment of this application, the first terminal device determines the first timing for the first measurement signal. The first timing is different from the timing II. This solution helps the second terminal device accurately receive the first measurement signal, and helps the second terminal device improve measurement precision of interference measurement. Further, because a distance between the second terminal device and the first terminal device is relatively short, time required for transmitting the measurement signal between the second terminal device and the first terminal device is approximately equal to 0. The first terminal device sends the first measurement signal by using the first timing that is equal to the timing I, to help synchronize sending the first measurement signal by the first terminal device with receiving the first measurement signal by the second terminal device. This solution has better compatibility and applicability.

Optionally, the method 200 may further include the following step:

Step 230: The first terminal device determines a second timing of a second measurement signal used by the first network device for measurement.

It should be understood that the first measurement signal and the second measurement signal may be measurement signals of a same type. For example, both the first measurement signal and the second measurement signal are SRSs.

It should be further understood that the second timing is different from the first timing in the foregoing description. The first timing is used to synchronize sending the first measurement signal by the first terminal device with receiving the first measurement signal by the second terminal device. The second timing is used to synchronize sending the second measurement signal by the first terminal device with receiving the second measurement signal by the first network device.

Optionally, the first terminal device may determine the second timing in a plurality of manners.

In an optional example, the first terminal device may determine the second timing according to the method 100.

For example, the first terminal device may determine the second timing by obtaining a latency caused by transmission of a signal 2 between the first terminal device and the first network device.

In another optional example, the second timing is equal to the timing II. In other words, the second timing may be equal to the uplink sending timing of the first terminal device.

Optionally, in this embodiment of this application, a timing advance of the second timing relative to the first timing meets:

$0 < TA_{2-1} \leq TA_0$, where $TA_{2-1}$ is the timing advance of the second timing relative to the first timing, $TA_0$ is a timing advance of the timing II relative to the timing I, and $TA_0=TA+TA\text{offset}$. In other words, in this embodiment of this application, the first timing lags behind the second timing.

It can be learned from the foregoing description that a transmission latency of the first measurement signal is shorter than a transmission latency of the second measurement signal, and therefore, the first timing lags behind the second timing. This helps improve measurement accuracy.

In still another optional example, the first terminal device may determine the second timing by receiving second indication information from the first network device. In other words, the method 200 may further include the following step:

Step 203: The sending object includes the first network device, and the first network device sends second indication information; correspondingly, the first terminal device receives the second indication information, where the second indication information is used to instruct the first terminal device to determine a second timing for sending the second measurement signal used by the first network device for measurement.

Step 230 may include the following step:

The first terminal device determines the second timing based on the second indication information.

The second indication information may indicate the second timing in a plurality of manners. For description of the second indication information indicating the second timing, refer to the foregoing related description. For brevity, details are not described again. It should be noted that if the second indication information includes a sequence identifier, the sequence identifier may be a dedicated cell identifier or a common cell identifier, or may be a predetermined identifier, so that the first terminal device may determine the second timing based on the second indication information.

Step 240: The first terminal device sends the second measurement signal based on the second timing.

Specifically, after determining the second timing, the first terminal device may send the second measurement signal at a time point included in the second timing.

It should be understood that the sending start moment at which the first terminal device sends the first measurement signal is different from a sending start moment at which the first terminal device sends the second measurement signal.

It may be learned from the foregoing description that, in this embodiment of this application, the first terminal device may send, based on different timings, measurement signals for different uses. In other words, in this embodiment of this application, timings that can be used to send a measurement signal include the first timing and the second timing. The terminal device may determine, based on a situation, a proper timing to send the measurement signal (for example, determine a proper timing according to an indication in indication information or according to a rule agreed in advance, and send the measurement signal by using the determined timing), to help improve measurement precision.

The foregoing describes the method according to the embodiments of this application with reference to FIG. 5 to FIG. 7, and the following describes the device according to the embodiments of this application with reference to FIG. 8 to FIG. 11.

Figure 8:
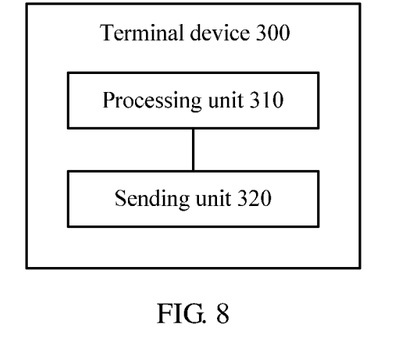
FIG. 8 is a schematic flowchart of a terminal device example according to an embodiment of this application.

FIG. 8 is a schematic block diagram of a terminal device example according to an embodiment of this application. As shown in FIG. 8, a terminal device 300 includes: a processing unit 310 and a sending unit 320.

The processing unit 310 configured to: determine a first timing of a first measurement signal used by a second terminal device for measurement, and determine a second timing of a second measurement signal used by the first network device for measurement. The first network device serving the first terminal device is different from a network device serving the second terminal device.

The sending unit 320 is configured to send the first measurement signal and the second measurement signal based on the first timing determined by the processing unit 310 and the second timing determined by the processing unit 310 respectively.

Optionally, the first timing is equal to a downlink receiving timing of the first terminal device.

Optionally, a timing advance of the second timing relative to the first timing meets $0<TA2\text{-}1 \leq TA0$, where $TA2\text{-}1$ is the timing advance of the second timing relative to the first timing, and $TA0$ is a timing advance of an uplink sending timing of the first terminal device relative to the downlink receiving timing of the first terminal device.

Optionally, the terminal device further includes a receiving unit, configured to receive first indication information and second indication information from the first network device. The first indication information is used to indicate the first timing, and the second indication information is used to indicate the second timing. The processing unit 310 is specifically configured to: determine the first timing based on the first indication information, and determine the second timing based on the second indication information.

It should be understood that the units and the foregoing other operations or functions of the terminal device 300 provided in this embodiment of this application are used to implement corresponding procedures performed by the terminal device in the method 200 provided in the embodiments of this application. For brevity, details are not described herein again.

Figure 9:
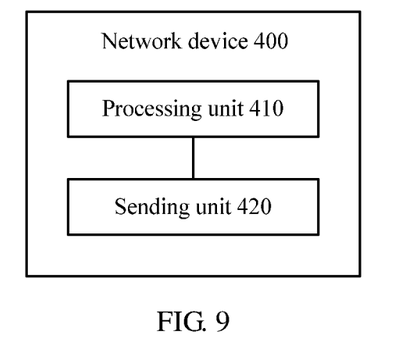
FIG. 9 is a schematic flowchart of a network device example according to an embodiment of this application.

FIG. 9 is a schematic block diagram of a network device example according to an embodiment of this application. As shown in FIG. 9, a network device 400 includes: a processing unit 410 and a sending unit 420.

The processing unit 410 is configured to determine a sending object of a measurement signal of a first terminal device. The sending object includes a second terminal device and the first network device. The first network device is a network device serving the first terminal device, and the first network device is different from a network device serving the second terminal device.

The processing unit 410 is further configured to determine first indication information and second indication information. The first indication information is used to instruct the first terminal device to determine a first timing for sending a first measurement signal used by the second terminal device for measurement, and the second indication information is used to instruct the first terminal device to determine a second timing for sending a second measurement signal used by the first network device for measurement.

The sending unit 420 is configured to send the first indication information and the second indication information to the first terminal device.

Optionally, the first timing is equal to a downlink receiving timing of the first terminal device.

Optionally, a timing advance of the second timing relative to the first timing meets 0<TA2-1≤TA0, where TA2-1 is the timing advance of the second timing relative to the first timing, and TA0 is a timing advance of an uplink sending timing of the first terminal device relative to the downlink receiving timing of the first terminal device.

It should be understood that the units and the foregoing other operations or functions of the network device 400 provided in this embodiment of this application are used to implement corresponding procedures performed by the network device in the method 200 provided in the embodiments of this application. For brevity, details are not described herein again.

Figure 10:
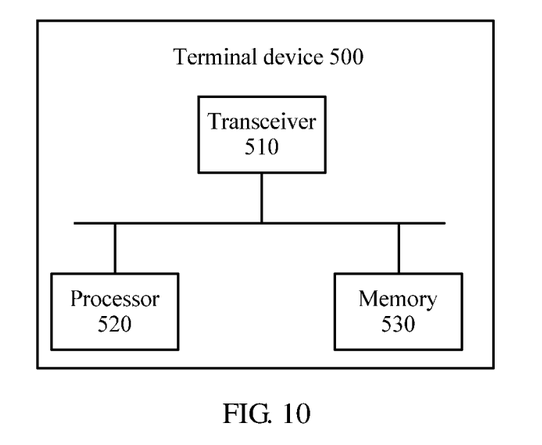
FIG. 10 is a schematic flowchart of another terminal device example according to an embodiment of this application.

FIG. 10 is a schematic block diagram of another terminal device example according to an embodiment of this application. As shown in FIG. 10, the terminal device 500 includes a transceiver 510 and a processor 520. The processor 520 is configured to support the terminal device in implementing corresponding functions of the terminal device in the foregoing method. Optionally, the terminal device 500 may further include a memory 530. The memory 530 is configured to couple with a processor 620, and store a program instruction and data that are necessary for the terminal device 500. The processor 520 is specifically configured to execute the instruction stored in the memory 530. When the instruction is executed, the terminal device performs the method performed by the terminal device in the foregoing method.

It should be noted that the terminal device 300 shown in FIG. 8 may be implemented by the terminal device 500 shown in FIG. 10. For example, the processing unit 310 shown in FIG. 8 may be implemented by the processor 520, and the sending unit 320 may be implemented by the transceiver 510.

Figure 11:
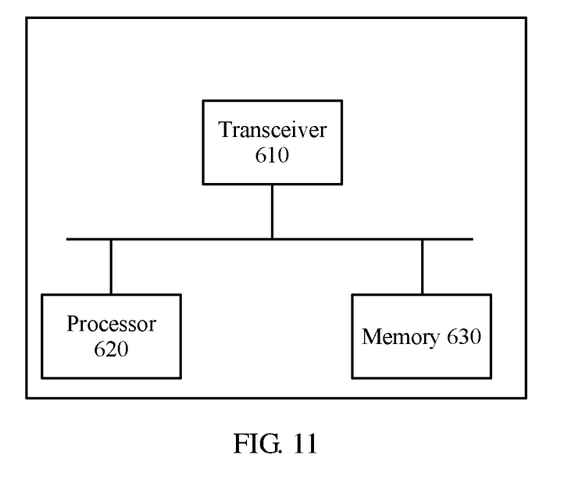
FIG. 11 is a schematic flowchart of another network device example according to an embodiment of this application.

FIG. 11 is a schematic block diagram of another network device example according to an embodiment of this application. As shown in FIG. 11, the network device 600 includes a transceiver 610 and a processor 620. The processor 620 is configured to support the network device in performing corresponding functions of the network device in the foregoing method. Optionally, the network device may further include a memory 630. The memory 630 is configured to couple with the processor 620, and store a program instruction and data that are necessary for the network device. The processor 620 is specifically configured to execute the instruction stored in the memory 630. When the instruction is executed, the network device performs the method performed by the network device in the foregoing method.

It should be noted that the network device 400 shown in FIG. 9 may be implemented by the network device 600 shown in FIG. 11. For example, the processing unit 410 shown in FIG. 9 may be implemented by the processor 620, and the sending unit 420 may be implemented by the transceiver 610.

It should be noted that the terminal device and the network device are used as an example in this application to describe the methods and the devices in the embodiments of this application. It should be understood that the methods in the embodiments of this application may be alternatively implemented by two baseband chips. A first baseband chip in the two baseband chips is configured to implement operations related to the terminal device in the embodiments of this application, and a second baseband chip in the two baseband chips is configured to implement operations related to the network device in the embodiments of this application.

It should be further noted that an input/output circuit of the first baseband chip can be configured to implement operations related to the transceiver of the terminal device in the foregoing description, and an input/output circuit of the second baseband chip can be configured to implement operations related to the transceiver of the network device in the foregoing description.

It should be understood that, the processor in the embodiments of this application may be a central processing unit (CPU), or may be another general-purpose processor, a digital signal processor (DSP), an application-specific integrated circuit (ASIC), a field programmable gate array (field FPGA) or another programmable logical device, a discrete gate or a transistor logical device, a discrete hardware component, or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

All or some of the foregoing embodiments may be implemented by using software, hardware, firmware, or any combination thereof. When software is used to implement the embodiments, the foregoing embodiments may be implemented all or partially in a form of a computer program product. The computer program product includes one or more computer instructions. When the computer program instruction is loaded and executed on a computer, the procedure or functions according to the embodiments of this application are all or partially generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, infrared, radio, and microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a digital versatile disc (digital versatile disc, DVD)), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current system, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a first terminal device, a first timing of a first measurement signal used by a second terminal device for measurement, wherein a first network device serving the first terminal device is different from a second network device serving the second terminal device;
   determining, by the first terminal device, a second timing of a second measurement signal used by the first network device for measurement; and
   sending, by the first terminal device, the first measurement signal and the second measurement signal according to the first timing and the second timing respectively.

2. The method according to claim 1, wherein the first timing is equal to a downlink receiving timing of the first terminal device.

3. The method according to claim 2, wherein a timing advance of the second timing relative to the first timing meets:
   $TA_{2-1}=TA_0$, wherein $TA_{2-1}$ is the timing advance of the second timing relative to the first timing, and $TA_0$ is a timing advance of an uplink sending timing of the first terminal device relative to the downlink receiving timing of the first terminal device.

4. The method according claim 1, wherein the method further comprises:
   receiving, by the first terminal device, first indication information and second indication information from the first network device, wherein the first indication information indicates the first timing, and the second indication information indicates the second timing, and wherein sending, by the first terminal device, the first measurement signal and the second measurement signal according to the first timing and the second timing respectively comprises:
   determining, by the first terminal device, the first timing according to the first indication information;
   sending the first measurement signal according to the first timing;
   determining, by the first terminal device, the second timing according to the second indication information; and
   sending the second measurement signal according to the second timing.

5. A method, comprising:
   determining, by a first network device, a sending object of a measurement signal of a first terminal device, wherein the first network device serves the first terminal device;
   when the sending object comprises a second terminal device, determining, by the first network device, first indication information;
   sending the first indication information to the first terminal device, wherein the first indication information instructs the first terminal device to determine a first timing for sending a first measurement signal used by the second terminal device for measurement, and the first network device is different from a second network device serving the second terminal device;

when the sending object further comprises the first network device, determining, by the first network device, second indication information; and sending the second indication information to the first terminal device, wherein the second indication information instructs the first terminal device to determine a second timing for sending a second measurement signal used by the first network device for measurement.

6. The method according to claim 5, wherein the first timing is equal to a downlink receiving timing of the first terminal device.

7. The method according to claim 6, wherein a timing advance of the second timing relative to the first timing meets:

$TA_{2-1}=TA_0$, wherein $TA_{2-1}$ is the timing advance of the second timing relative to the first timing, and $TA_0$ is a timing advance of an uplink sending timing of the first terminal device relative to the downlink receiving timing of the first terminal device.

8. A terminal device, wherein the terminal device is a first terminal device, and the terminal device comprises:

a processor;

a non-transitory computer-readable storage medium storing a program to be executed by the processor, the program including instructions for:

determining a first timing of a first measurement signal used by a second terminal device for measurement;

determining a second timing of a second measurement signal used by a first network device for measurement, wherein the first network device serves the first terminal device and is different from a second network device serving the second terminal device; and a transmitter configured to send the first measurement signal and the second measurement signal according to the first timing and the second timing respectively.

9. The terminal device according to claim 8, wherein the first timing is equal to a downlink receiving timing of the first terminal device.

10. The terminal device according to claim 9, wherein a timing advance of the second timing relative to the first timing meets:

$TA_{2-1}=TA_0$, wherein $TA_{2-1}$ is the timing advance of the second timing relative to the first timing, and $TA_0$ is a timing advance of an uplink sending timing of the first terminal device relative to the downlink receiving timing of the first terminal device.

11. The terminal device according claim 8, wherein the terminal device further comprises:

a receiver configured to receive first indication information and second indication information from the first network device, wherein the first indication information indicates the first timing, and the second indication information indicates the second timing, wherein the instructions comprise further instructions for determining the first timing according to the first indication information, and determining the second timing according to the second indication information.

* * * * *